United States Patent
Porcelli

(10) Patent No.: US 10,833,609 B2
(45) Date of Patent: Nov. 10, 2020

(54) INDUCTION OF FORCE PERFORMED BY THE PIEZOELECTRIC MATERIALS

(71) Applicant: Elio Battista Porcelli, Sao Paulo (BR)

(72) Inventor: Elio Battista Porcelli, Sao Paulo (BR)

(*) Notice: Subject to any disclaimer, the term of this patent is extended or adjusted under 35 U.S.C. 154(b) by 575 days.

(21) Appl. No.: 14/146,373

(22) Filed: Jan. 2, 2014

(65) Prior Publication Data
US 2015/0188026 A1    Jul. 2, 2015

(51) Int. Cl.
*H02N 2/00* (2006.01)
*H01L 41/04* (2006.01)

(52) U.S. Cl.
CPC .................. *H02N 2/002* (2013.01)

(58) Field of Classification Search
CPC ........... H04R 17/00; G10K 9/122; H02N 2/00
USPC ................................. 310/311–371
See application file for complete search history.

(56) References Cited

U.S. PATENT DOCUMENTS

| | | | | |
|---|---|---|---|---|
| 3,173,100 A | * | 3/1965 | White | H01B 1/00 257/1 |
| 3,405,374 A | * | 10/1968 | Dayem | B06B 1/04 257/35 |
| 3,486,368 A | * | 12/1969 | Brech | G01B 17/00 73/615 |
| 3,585,415 A | * | 6/1971 | Muller | G01L 1/16 257/254 |
| 4,088,028 A | * | 5/1978 | Hildebrandt | G01B 17/02 702/39 |
| 2010/0133447 A1 | * | 6/2010 | Gaitan | B01J 19/008 250/432 R |

FOREIGN PATENT DOCUMENTS

JP    73015760 B   * 12/1968   .......... H01L 41/187

OTHER PUBLICATIONS

Shi et al., "Exciton states in wurtzite LnGaN strained coupled quantum dots: Effects of piezoelectricity and spontaneous polarization", AIP Journal of Applied Physics, 97, 083705 (2005), pp. 1-17.*

* cited by examiner

*Primary Examiner* — Thomas M Dougherty
(74) *Attorney, Agent, or Firm* — Welsh Flaxman & Gitler LLC

(57) ABSTRACT

Until now, the direct effect or the converse effect is used in piezoelectric devices to provide respectively a disturbance force in external objects via electric field or acoustic waves. The collective displacement of the internal polarized molecules of the piezoelectric materials can be used in innovative ways when the direct or the converse effect takes place. This attribute is associated when all particles which are part of macroscopic objects are widely coupled to each other via quantum entanglements and it can generate a distance induction force. Considering this, an induction force can be inducted in the external objects, thereby thrusting or pull them.

1 Claim, 4 Drawing Sheets

Figure 1
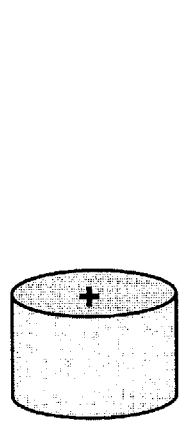
Figure 1A
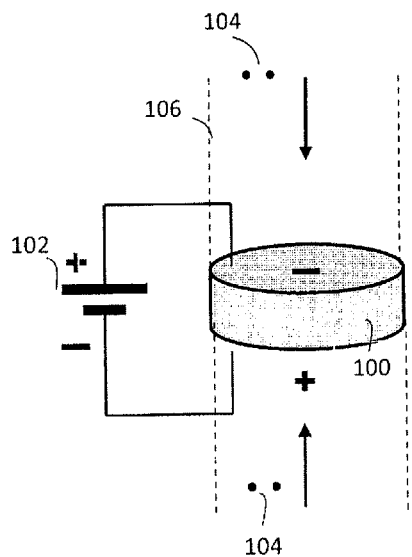
Figure 1B
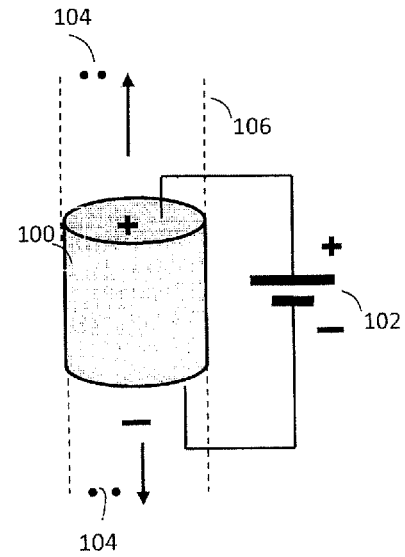
Figure 1C
Figure 2
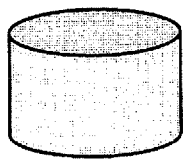
Figure 2A
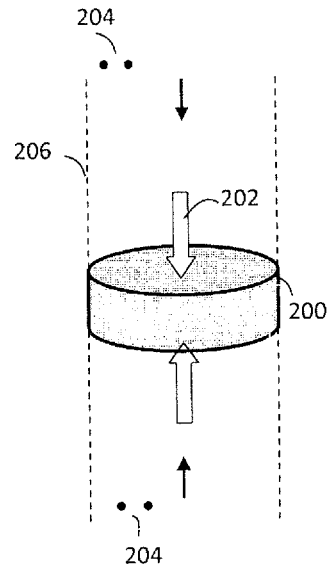
Figure 2B
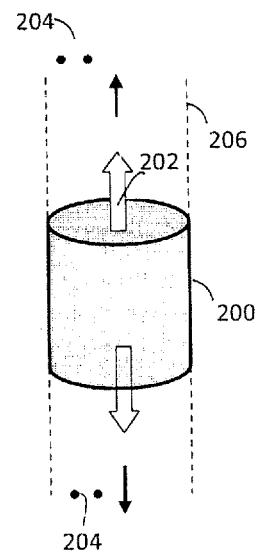
Figure 2C

INDUCTION OF FORCE PERFORMED BY THE PIEZOELECTRIC MATERIALS

BACKGROUND OF THE INVENTION

1. Field of the Invention

The present invention relates to piezoelectric materials used for creating an induction force in external objects. Specifically, the induction generation is performed with its molecular structure widely coupled with the environment when the direct effect or the converse effect can take place. This coupling is not intermediated by the acoustic waves or the electromagnetic fields and it results from the quantum entanglements. The direction of the induction force depends on the direction of the mechanical force or the electric field applied to these materials.

2. Description of the Related Art

Present day piezoelectric materials are often used for high voltage and power sources, for sensors, for actuators, for frequency standards, for motors and for many other applications.

Important new applications can be performed considering some emergent properties of those piezoelectric materials.

The special use of those piezoelectric materials is in its polarized molecular structure and in the voltage or (mechanical) contact force applied respectively when the direct effect or the converse effect takes place.

The main agents for these new applications are the coupling of the polarized molecules with external particles in the environment (some of them are part of the macroscopic objects).

The coupling between the polarized molecules and all other external particles is performed according to the concept of Generalized Quantum Entanglement.

When a voltage or a mechanical force is applied, an amount of momentum transfers from the polarized molecules and the external particles in the case a piezoelectric material such as a quartz crystal or a PZT ceramic (that is, a lead zirconium titanate). The momentum direction depends on the direction of the electric field or the mechanical force applied. This particular attribute of a piezoelectric material allows the creation of a considerable induction of force in other external objects.

External objects can be inducted by the piezoelectric materials independent of their constitution. On the other hand, the induction can affect all kind of objects or particles and this is not a result of acoustic waves or electromagnetic fields, for example, electromagnetic interactions can only affect electrical charged particles. This induction is related to the wide coupling between the particles predicted by the Generalized Quantum Entanglement concept.

The intensity of induction depends directly on the intensity of the homogeneous electric field (voltage) or the mechanical force applied. Other dependence is related to the piezoelectric parameters of the materials microscopically defined by the internal quantity of polarized molecules and their collective geometry.

The divergence of the induction of force is determined by parameters such as the shape of bulk of the piezoelectric material, the homogeneity of the internal polarized molecular density and the homogeneity of the electric field or mechanical force applied. Considering this, the induction may affect external objects placed at various distances from the position of the piezoelectric material bulk. In other words the space geometry of the induction can be focused or not, but this can be adjusted accordingly.

SUMMARY OF THE INVENTION

It is well known that the piezoelectric materials find wide use through their main property named "converse effect" which converts electrical energy to mechanical energy wherein the application of an electrical field creates deformation in the crystal and mechanical force. The other main property of piezoelectric materials is named "direct effect" and is related to the conversion of mechanical energy to electrical energy where the application of a mechanical force produces a voltage. Surprisingly, these materials can be used like inductors of force and such induction is not intermediated by acoustic waves or electromagnetic fields, but is caused by collective displacement of the internal polarized molecules when the direct effect or converse effect take place and its mutual coupling with the external environment.

An innovative feature of the invention is that there is a coupling between these polarized molecules and the external environment via widely existing quantum entanglements. Properly adjusting some parameters such as the intensity of the electric field or mechanical contact force applied in the material and also the properties of the material, it is possible to control the force inducted in external targets placed in any medium.

BRIEF DESCRIPTION OF THE DRAWINGS

The invention will now be explained in more detail with reference to several embodiments and the drawing, in which:

FIG. 1, comprised of FIG. 1A, FIG. 1b and FIG. 1c, diagrammatically shows a geometrical direction of the induction force that emerges from the piezoelectric material making a vertical attraction in the external targets when it is reversely polarized by the battery such as shown in FIG. 1B and making a vertical repulsion in the external targets when this same material is directly polarized by the battery such as shown in the FIG. 1C. Negligible induction is made when a voltage is not applied in the piezoelectric material such as shown in the FIG. 1A;

FIG. 2, comprised of FIG. 2A, FIG. 2B and FIG. 2C, diagrammatically shows a geometrical direction of the induction force that emerges from, the piezoelectric material making a vertical attraction in the external targets when it is mechanically compressed such as shown in FIG. 2B and making a vertical repulsion in the external targets when this same material is mechanically extended such as shown in the FIG. 2C. Negligible induction is made, when a mechanical force is not applied in the piezoelectric material such as shown in the FIG. 2A;

DETAILED DESCRIPTION OF THE INVENTION

Figure 3:
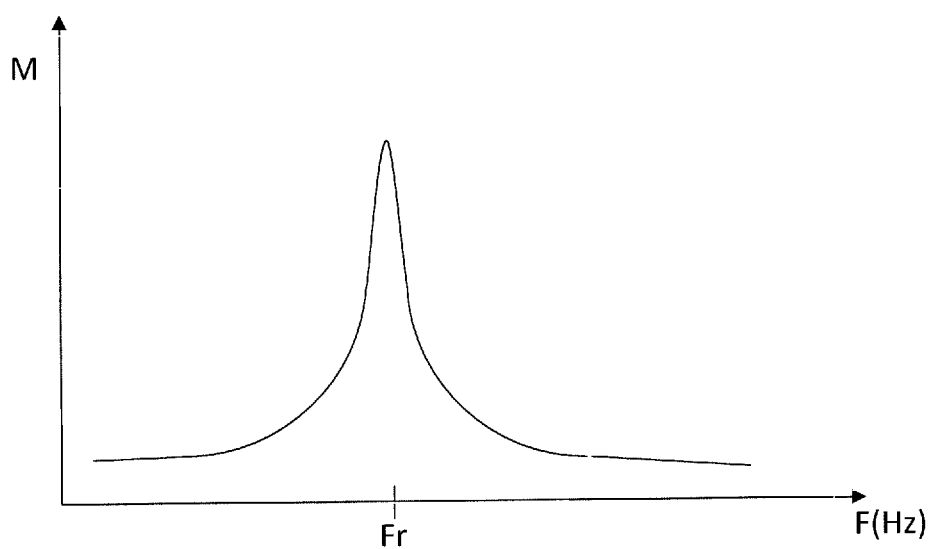
FIG. 3 graphically shows the curve of the mechanical admittance or mobility M according to the frequency F in the vibration mode of the piezoelectric material. The intensity of the induction force follows directly this curve of mechanical admittance Y and the point of the higher intensity is placed in the resonance frequency Fr of the piezoelectric material.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

FIG. 1, comprised of FIGS. 1A, 1B and 1C, diagrammatically shows a geometrical direction of the induction force that emerges from a piezoelectric material 100 making a vertical attraction in the external targets when it is reversely polarized by the battery 102 such as shown in FIG. 1B. In this condition, the polarized molecules of the piezoelectric material 100 behave such as electric dipoles and are mutually re-oriented into the structure of the piezoelectric material 100 by the vertical electric field. The shape of the piezoelectric material 100 is compressed in the vertical direction in comparison than its original shape. The molecules are coupled with other external particles 104 in the environment via generalized quantum entanglements. Considering this attribute, the external particles 104 placed in the direction of the projected area 106 of the piezoelectric material 100 extending above and below the material in the direction of the vertical electrical field undergo an attraction diagrammatically shown by arrows following the re-orientation of the internal polarized molecules. When the piezoelectric material 100 is directly polarized by the battery 102 such as showed in the FIG. 1C a vertical repulsion diagrammatically shown by arrows in the external targets 104 takes place. The shape of the piezoelectric material 100 is extended in the vertical direction in comparison than its original shape. The external targets 104 placed althrough the projected area 106 above and below the material in which the repulsion of the external targets 104 will take place. In this condition, the external particles 104 placed in the direction of the induction force of the piezoelectric material 100 follows the re-orientation of the internal polarized molecules in the outer direction from the faces considering the coupling via generalized quantum entanglements. The direction of the induction force when the piezoelectric material 100 is polarized (reversely or directly) can be collimated without attenuation with the distance apart of the material area depending on the geometry of the piezoelectric material 100, the uniformity of the density of internal molecules and the parallelism of the electric field lines applied. The attraction or repulsion of the external particles 104 has no dependence on their attributes such as electrical charge. The intensity of the induction force depends on the intensity of the electric field applied for the collective molecular re-orientation, but a binding electrical intermolecular (and interatomic) interaction can act against this re-orientation. In this way, the intensity of the induction force depends directly on the mechanical force caused by the compression (or distention) of the piezoelectric material 100 such as generated when some voltage is applied on it and depends inversely on a macroscopic parameter of elasticity named "Young Modulus".

A piezoelectric parameter g33 for PZT ceramics (the most common piezoelectric material in the marketplace—PZT means Lead Zirconate Titanate) indicates the relationship between the voltage V applied over some thickness T and the mechanical force F that it generates according to the follow formula: $g33=V*t/F$.

Considering the knowledge about the voltage V applied and about some parameters of the PZT ceramic such as g33 and T, it is possible to calculate the mechanical force intensity using the relationship mentioned before and as the result: $F=V*t/F$.

The strain S can be calculated considering the formula $S=F/A$, where S is the strain in the piezoelectric material; F is the mechanical force as mentioned before and A is the circular area of the material.

A parameter named "deformation" D has no dimensionality in terms of physical quantity and it means the tax of deformation of the piezoelectric material when a voltage is applied on it. This parameter D can be calculated by the formula: $D=S/Y$; where S is the strain in the piezoelectric material; Y is the Young modulus and D is the deformation. The parameter D can be multiplied to the value of the mechanical force in order to calculate the intensity of the—induction force using the formula shown: $f=F*D$, where f is the intensity of the induction force; F is the mechanical force and D is the deformation parameter. In case of null voltage applied to the piezoelectric material, there is a negligible induction force generated considering the null deformation in this condition such as Shown in the FIG. 1a.

FIG. 2, comprised of FIGS. 2A, 2B and 2C, diagrammatically shows a geometrical direction of the induction force that emerges from the piezoelectric material 200 making a vertical attraction in the external targets when it is mechanically compressed 202 such as shown in FIG. 2B.

In this condition, the piezoelectric material 200 is compressed by a contact force that acts at the point of contact with another object. For example, an electromechanical actuator can compress the piezoelectric material, fact, the objects do not actually touch each other; rather contact forces are the result: of the electrical interactions of the electrons at or near the surfaces of the objects. These interactions propagate molecule by molecule from both surfaces to the core of the piezoelectric material 200. In this way, the internal molecules of the piezoelectric material 200 are re-oriented into its structure following the direction of the contact force. These molecules are coupled with other external particles 204 in the environment via generalized quantum entanglements. Considering this attribute, the external particles 204 placed in the direction of the projected area 206 of the piezoelectric material 200 extending above and below the piezoelectric material 200 in the direction of the contact force undergo an attraction diagrammatically shown by arrows following the reorientation of the internal polarized molecules.

When the piezoelectric Material 200 is mechanically extended such as shown in the FIG. 2C, a vertical repulsion diagrammatically shown by arrows in the external targets 204 takes place. In this condition, the piezoelectric material 200 is extended by a contact force that acts at the point of contact with other object. As mentioned before, the objects do not actually touch each other; rather contact forces are the result of the electrical interactions of the electrons at or near the surfaces of the objects. These interactions propagate molecule by molecule from both surfaces to the core of the material.

The internal molecules of the piezoelectric material 200 are re-oriented in the outer direction from the faces of the piezoelectric material 200. The external particles 204 placed in the direction of the projected area 206 of the piezoelectric material 200 are repulsed considering its coupling with the material molecules via generalized quantum mechanics according to the direction of the contact force. The direction of the induction force when the piezoelectric material 200 is mechanically compressed (or extended) can be collimated without attenuation with the distance apart of the material area 206 depending on the geometry of the piezoelectric material 200, the uniformity of the density of internal molecules and the alignment of the acoustic shock waves propagating into the piezoelectric material.

The attraction or repulsion of the external particles 204 has no dependence on their attributes such as electrical charge. The intensity of the induction force depends on the intensity of the (mechanical) contact force which is applied for generating the collective molecular re-orientation. A binding electrical intermolecular (and interatomic) interaction can act against this mentioned re-orientation. In this way, the intensity of the induction force depends directly on the mechanical force caused by the compression (or distention) of the piezoelectric material 200 and depends inversely on a macroscopic parameter of elasticity named "Young Modulus". It is remarkable that the cause of the induction force for external particles is its coupling (via generalized quantum entanglements) with the polarized molecules of the piezoelectric subject to a contact force in case of direct effect such as shown in the FIGS. 2A and 2C or a force inducted by an electrical field in case of converse effect such as shown in the FIGS. 1B and 1C is applied.

The methodology for intensity of the induction force calculation is the same in case of piezoelectric materials subject to a direct effect or reserve effect.

First of all, the strain S can be calculated considering the formula S=F/A, where S is the strain in the piezoelectric material; F is the (mechanical) contact force as mentioned before and A is the circular area of the Material.

Second, a parameter named "deformation" D is not dimensional in terms of physical quantity and this means the rate of deformation of the piezoelectric material is calculated when a (mechanical) contact force is applied on it. This parameter D can be calculated by the formula: D=S/Y; where S is the strain in the piezoelectric material; Y is the Young modulus and D is the deformation.

First of all, the strain S can be calculated using the formula S=F/A, where S is the strain in the piezoelectric material; F is the (mechanical) contact force as mentioned before and A is the circular area of the material.

Second, a parameter named "deformation" D has no dimensionality in terms of physical quantity and is defined as the rate of deformation of the piezoelectric material when a (mechanical) contact force is applied on it. This parameter D can be calculated by the formula: D=S/Y; where S is the strain in the piezoelectric material; Y is the Young modulus and D is the deformation.

Finally, the parameter D can be multiplied to the value of the (mechanical) contact force in order to calculate the intensity of the induction force using the formula shown: f=F*D where f is the intensity of the induction force; F is the (mechanical) contact force and F) is the deformation parameter. In case of null (mechanical) contact force applied in the piezoelectric material, there is a negligible induction force generated considering the null deformation in this condition such as shown in the FIG. 2A.

FIG. 3 graphically shows the curve of the mechanical admittance or mobility M according to the frequency F in the mechanical oscillation mode of the piezoelectric material. It was considered a continuous contact force applied in case of the direct effect such as shown in the FIGS. 2B and 2C or a force generated by a continuous electric field in case of the converse effect such as shown in the FIGS. 1B and 1C so far. The "continuous" word means that the action is invariable in the time. The piezoelectric materials have a characteristic behavior when subject to variable forces in the time.

In case of converse effect, where the application of a variable electrical field in the time creates mechanical deformation which is also variable in the piezoelectric material, the conversion rate from the electrical to the mechanical energy follows graphically a curve of mechanical admittance (or mobility M) such as shown in the FIG. 3. The analogue behavior can be found in case of direct effect where the conversion rate from the mechanical energy to the electrical energy when a mechanically variable contact force in time is applied.

The peak of the curve of mechanical admittance (or mobility M) can be graphically found for a particular frequency named Fr (resonance frequency). For this value of the frequency, the maximum energy conversion rate can be found.

The mechanical admittance (or mobility M) for the particular frequency of mechanical oscillation (or electric field oscillation) is deeply linked with the natural oscillation frequency of the polarized molecules of the piezoelectric material coupled mutually via intermolecular and interatomic electric interactions. The polarized molecules are also coupled with external particles via generalized quantum entanglements. Considering this, the intensity of the induction force can be calculated using the formula f=Fa*M/Mr, where f is the intensity of induction force, Fa is the variable mechanical force in time existing in the piezoelectric material for direct or converse effect, M is the admittance or Mobility for the Frequency oscillation of the force applied and Mr is the admittance or Mobility for the resonance frequency of the piezoelectric material. This formula is valid for a value of the frequency oscillation of the force applied F lowers than the resonance frequency Fr (F≤Fr). The intensity of the induction force calculation for some specific sample of piezoelectric material must be made by using the values (M and Mr) from the curve of the mechanical admittance or mobility M such as shown in the graphic of the FIG. 3. This curve can be obtained by measurements of the sample applying different values of oscillation frequencies.

Figure 4:
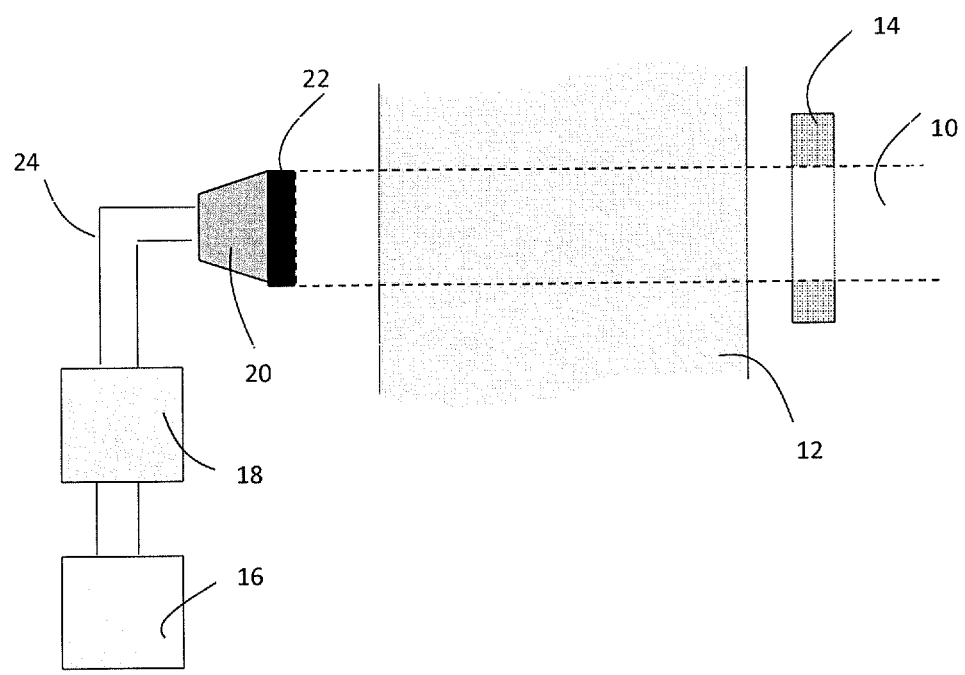
FIG. 4 diagrammatically shows a specific use of the invention which relates to a converse effect for a piezoelectric ceramic disc.

FIG. 4 diagrammatically shows a specific use of the invention which relates to a piezoelectric ceramic disc PZT4 where the direct effect takes place and the application of the mechanical contact force variable in time perpendicular to the flat surfaces create an induction force at the same direction. The direction of the induction force 10 is shown in the area A emerging from a piezoelectric disc 22. The induction force 10 crosses an acoustic and electromagnetic barrier 12 (shown as a wall in FIG. 4), The barrier 12 can block any acoustic or electromagnetic signal or at least reduce its intensity in order to be undetectable. The physical property of the induction force 10 allows it to cross any barrier and considering this, the accelerometer 14 positioned on a side of the barrier 12 opposite the piezoelectric disc 22 is crossed by the induction force and can detect the intensity of the induction force 10 accordingly. The induction force 10 detected is variable in the time.

The loudspeaker 20 with 4 Ohms of electrical impedance makes a necessary mechanical vibration of the piezoelectric disc 22 where it is coupled. The loudspeaker 20 is electrically connected via two wires 24 in the audio amplifier 18. The audio signal generator 16 of sinusoidal wave produces the electric signal to be amplified by the power amplifier 18.

The piezoelectric ceramic disc 22 considered in this setup has a 5 cm diameter, 2.5 mm thickness and a 913.2 kHz regarding the resonance frequency Fr for the vibration in the axis direction.

Considering the maximum power from the audio amplifier 18, the total amplitude of the sinusoidal (mechanical) contact force applied in the axis direction of the piezoelectric ceramic disc by the loudspeaker 20 is $7.33*10^{-3}$ N for a frequency as 500 Hz according to the measurements made by the accelerometer 14.

The contact force Fa is a plied to the circular surface of the piezoelectric ceramic disc 22. The intensity of the induction force 10 can be calculated according to the formula f=Fa*M/Mr as shown in the graphical representation of the FIG. 3. Regarding that, the M is the admittance (or Mobility) for the (mechanical) contact force Fa applied with a frequency F and Mr is the admittance (or Mobility) for the (mechanical) contact force when the resonant frequency Fr takes place.

The admittances M and Mr related to the frequencies F and Fr respectively can be obtained from the specific curve of admittance (or Mobility) for the piezoelectric ceramic disc PZT4 as shown in the FIG. 3.

In the case where the frequency F is much lower than the frequency Fr (F<<Fr), the rate F/Fr can be used instead of M/Mr for a good approach.

Considering this information, we can calculate the intensity of the induction force by the formula f=Fa*F/Fr.

$$f=7.33*10^{-3}*500/913.2*10^{3}=4*10^{6} \text{ N}$$

Considering die intensity of the induction force f and considering an accelerometer mass "Ma" equal to 39.3*10 Kg, the acceleration "a" measured by the accelerometer can be calculated by the Newton formula as follow:

$$a=f/Ma=4*10^{6}/39.3*10^{3}=1.02*10^{4} \text{ m/s}^2$$

This value related to the acceleration is in accordance with the average for the values measured by the accelerometer 14.

The intensity of the induction force is strong enough to be detected by an accelerometer 14 with 0.00006 g resolution. This mentioned setup is preliminary but the parameters, features and new materials can be improved in order to generate a strong induction force in the external objects for general purposes.

The best performance (maximum intensity of induction force) can be achieved when it is generated a high power oscillation with a frequency with the same value than the resonant frequency (F=Fr).

The setup shown in the FIG. 4 can be used for metrology considering the actual difficulties to mark two or more points that need to be geometrically linked by a straight line in the huge and massive structures where it cannot be crossed easily by light laser beam, other electromagnetic signals or acoustic waves.

Currently the methodology for this procedure is expensive, inaccurate and time consuming, considering that marry external sensors e used around the structure where the measurements are made indirectly.

Figure 5:
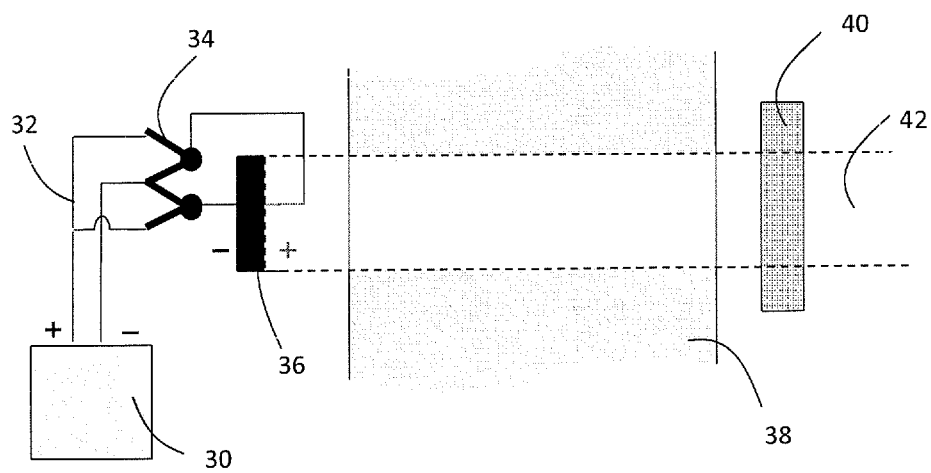
FIG. 5 diagrammatically shows a specific use of the invention relating to a direct effect for a piezoelectric ceramic disc.

FIG. 5 diagrammatically shows a specific use of the invention which relates to a direct effect for a piezoelectric ceramic disc 36. The direction of the induction force 42 shown in FIG. 5 is emerging from a piezoelectric disc 36. The direction of the induction force 42 is crossing an acoustic and electromagnetic barrier 38 (shown as a wall in FIG. 5). The physical property of the induction 42 allows it to cross an barrier and considering this, the accelerometer 40 which is crossed by the induction force 42 can detect its intensity accordingly. The High Voltage Power Supply 30 provides a DC voltage via the wires 32 for the both circular faces of the piezoelectric ceramic disc 36 with 5 cm diameter and 2.5 mm thickness.

The two twin switches 34 can be adjusted accordingly to polarize the piezoelectric ceramic disc 36. In the red position, the switches 34 connect the positive pole of the power supply 30 in the positive face of the piezoelectric ceramic disc 36 and it connects at the same time the negative pole of the power supply 30 in the negative face of the piezoelectric ceramic disc 36. The shape of the piezoelectric disc 36 is expanded and it projects a repulsive induction force. In the blue position, the switches 34 connect the positive pole of the power supply 30 in the negative face of the piezoelectric ceramic disc 36 and it connects at the same time the negative pole of the power supply 30 in the positive face of the piezoelectric ceramic disc 36. The shape of the piezoelectric disc 36 is compressed and it projects an impulsive induction force.

The piezoelectric ceramic disc 36 considered in this setup has a 5 cm diameter, 2.5 mm thickness, g33 parameter equal to 0.02292 Vm/N and Y33 parameter equal to $6.2*10^{10}$ N/m² It is considered a maximum voltage applied between its circular faces equal to 1000V.

This information allows us to calculate the intensity of the attractive or repulsive induction force measured by the accelerometer.

The modulus of the force for the 1000V voltage applied in the piezoelectric ceramic disc 36 can be calculated using the formula F=V*t/g33 as showed in the description of the its calculation can be made as follows:

$$F=1000*2.5*10^{-3}/0.02292=109.1 \text{N}.$$

The second step is to calculate the strain S using the formula S=F/A as shown in the description of the FIG. 1:

$$S=F/A=109.1/1.964*10^{3}=55,564.17 \text{ N/m}^2$$

Where, A is the circular area of the disc.

The next step is to calculate the deformation D using the formula D=S/Y33 as shown in the description of the FIG. 1:

$$D=S/Y33=55,564.17/6.2*10^{10}=8.967*10^{-7}.$$

Finally, the induction force can be calculated according the calculation as shown in the description of the FIG. 1:

$$f=F*D=109.1*8.972*10^{-7}=9.78*10^{-5} \text{ N}$$

For this intensity of the induction force and considering the accelerometer mass "Ma" equal to $39.3*10^{\wedge}-3$ Kg, the acceleration "a" measured by the accelerometer can be calculated by the Newton formula as follow:

$$a=f/Ma=9.78*10^{-5}/39.3*10^{-3}=2.49*10^{-3} \text{ m/s}^2.$$

This value of acceleration "a" is according to the average value of the measurements made by the accelerometer.

The intensity of the induction force is strong enough to be detected by an accelerometer with 0.00006 g resolution. This mentioned setup is preliminary but the parameters, features and new materials can be improved in order to generate a strong induction force in the external objects for general purposes.

The best materials need to be a small value regarding the g33 parameter and a high value in terms of electrical insulation in order to support a high voltage application.

The setup shown in the FIG. 5 can be also used for metrology considering the actual difficulties to mark two or more points that need to be geometrically linked by a straight line in the huge and massive structures where it cannot be crossed easily by light laser beam, other electromagnetic signals or acoustic waves.

Currently the methodology for this procedure is expensive, inaccurate and time consuming, considering that many external sensors are used around the structure where the measurements are made indirectly.

What is claimed is:

1. A method for using piezoelectric devices to produce induction forces in an accelerometer on opposite sides of an acoustic and electromagnetic barrier comprising the steps of:
positioning the piezoelectric devices and the accelerometer on opposite sides of the acoustic and electromagnetic barrier;
activating the piezoelectric devices via application of an electrical field or a mechanical force to the piezoelectric devices;
initiating generalized quantum entanglements between internal polarized molecules of the piezoelectric devices and the accelerometer placed in a beam environment so as to produce induction forces crossing the acoustic and electromagnetic barrier; and
adjusting an intensity of the electric field or the mechanical force applied to the piezoelectric devices to produce the induction forces that cross the acoustic and electromagnetic barrier; and
calculating the intensity of induction force measured by the accelerometer.

* * * * *